United States Patent
Tommasi et al.

(10) Patent No.: US 12,132,730 B2
(45) Date of Patent: Oct. 29, 2024

(54) BEHAVIOR DRIVEN SECURITY FOR IOT DEVICES

(71) Applicant: INTERNATIONAL BUSINESS MACHINES CORPORATION, Armonk, NY (US)

(72) Inventors: Pierpaolo Tommasi, Dublin (IE); Elizabeth Daly, Dublin (IE); Martin Stephenson, Ballynacargy (IE)

(73) Assignee: International Business Machines Corporation, Armonk, NY (US)

(*) Notice: Subject to any disclaimer, the term of this patent is extended or adjusted under 35 U.S.C. 154(b) by 247 days.

(21) Appl. No.: 17/656,327

(22) Filed: Mar. 24, 2022

(65) Prior Publication Data

US 2023/0308438 A1    Sep. 28, 2023

(51) Int. Cl.
    H04L 9/40    (2022.01)
(52) U.S. Cl.
    CPC .................. H04L 63/0876 (2013.01)
(58) Field of Classification Search
    CPC .................................................. H04L 63/0876
    See application file for complete search history.

(56) References Cited

U.S. PATENT DOCUMENTS

| 10,673,880 | B1 * | 6/2020 | Pratt | H04L 63/1425 |
| 10,679,391 | B1 * | 6/2020 | Donnici | H04M 1/72451 |
| 2019/0349391 | A1 * | 11/2019 | Elsner | H04L 63/1425 |
| 2021/0158976 | A1 | 5/2021 | Oh | |

FOREIGN PATENT DOCUMENTS

WO    2017161457 A1    9/2017

OTHER PUBLICATIONS

"About ubiworx," Downloaded from the internet Mar. 23, 2022, 6 pages.
"How Nest thermostats learn—GoogleNest Help," Downloaded from the internet Mar. 23, 2022, support.google.com, 6 pages.
"how the Notion system works," Downloaded from the internet Mar. 23, 2022, 8 pages.
Ashibani, Yosef et al., "A Behavior Profiling Model for User Authentication in IoT Networks Based on App Usage Patterns," IECON 2018—44th Annual Conference of the IEEE Industrial Electronics Society, pp. 2841-2846, IEEE, 2018.
Ghosh, Nirnay et al., "SoftAuthZ: A Context-Aware, Behavior-Based Authorization Framework for Home IoT," IEEE Internet of Things Journal 6, No. 6, 2019, 13 pages.

(Continued)

*Primary Examiner* — Bruce S Ashley
(74) *Attorney, Agent, or Firm* — Eric W. Chesley (57) ABSTRACT

A method, system, and computer program product for behavior-based Internet of Things (IoT) device security are provided. The method detects an action from a set of IoT devices. A context is identified for the action and at least one IoT device of the set of IoT devices. The action and the context are validated for the at least one IoT device. The action is identified as an anomaly based on the validating of the action and the context. A potential state change is identified for the at least one IoT device based on the anomaly. The method determines a responsive action based on the potential state change and the anomaly.

20 Claims, 6 Drawing Sheets

(56) References Cited

OTHER PUBLICATIONS

Reyes-Campos, Josimar et al., "Discovery of Resident Behavior Patterns Using Machine Learning Techniques and IoT Paradigm," Mathematics 9, No. 3, 2021, 25 pages.

Severi et al., "M2M technologies: Enablers for a pervasive Internet of Things," 2014 European Conference on Networks and Communications (EuCNC), 2014, pp. 1-5, doi: 10.1109/EuCNC.2014.6882661.

Tandon, Lakshya et al., "HCAP: A History-based Capability System for IoT Devices," Proceedings of the 23nd ACM on Symposium on Access Control Models and Technologies, pp. 247-258, 2018.

Venkatesh et al., "A Framework to Extract Personalized bahvioural Patterns of User's IoT Devices Data," Proceedings of IBM Canada, Nov. 2017, 6 pages.

Bakar et al. "Activity and Anomaly Detection in Smart Home: A Survey", Next Generation Sensors and Systems, Jan. 2016, pp. 191-220, DOI:10. 1007/978-3-319-21671-3_9.

Das et al. "Incorporating Expert Feedback into Active Anomaly Discovery," 2016 IEEE 16th International Conference on Data Mining (ICDM), Barcelona, Spain, Dec. 12-15, 2016, pp. 853-858, doi: 10.1109/ICDM.2016.0102.

Das et al. "Incorporating Feedback into Tree-based Anomaly Detection", arXiv:1708.09441, Aug. 30, 2017, 9 pages.

Dias et al. "A Cooperative Watchdog System to Detect Misbehaviour Nodes in Vehicular Delay-Tolerant Networks", IEEE Transactions on Industrial Electronics, Dec. 2015, pp. 7929-7937, vol. 62, No. 12.

Fovino et al. " Distributed Critical State Detection System for Industrial Protocols." Proceedings of IFIP International Conference on Critical Infrastructure Protection, 2010, 16 Pages.

Franks et al. "Security Analytics Is the New Approach to IoT Security", Gurucul, Oct. 17, 2019, 5 pages.

Masaaki et al. "Anomaly Detection in Smart Home Operation from User Behaviours and Home Conditions", IEEE Transactions on Consumer Electronics, Mar. 18, 2020, 1pp. 83-192, DOI: 10.1109/TCE.2020.2981636.

NOVÁK et al. "Unobtrusive Anomaly Detection in Presence of Elderly in A Smart-Home Environment", ELEKTRO. 2012, May 2012, 1pp. 91-220, DOI:10.1109/ELEKTRO.2012.6225617.

You et al. "Misbehavior Detection of Embedded IoT Devices in Medical Cyber Physical Systems", CHASE '18: Proceedings of the 2018 IEEE/ACM International Conference on Connected Health: Applications, Systems and Engineering Technologies, Jan. 22, 2020, pp. 88-93, doi:10.1145/3278576.327860190.

\* cited by examiner

BEHAVIOR DRIVEN SECURITY FOR IOT DEVICES

BACKGROUND

Internet of Things (IoT) devices have proliferated throughout the consumer and business space. IoT devices within the home are often described as smart home devices. Smart home devices include heating components, lighting components, door locks, blinds, and other common home accoutrements. IoT devices in businesses and large enterprises can be similar in type and function to those within the consumer space. Security of IoT devices is often based on access control and communications network security.

SUMMARY

According to an embodiment described herein, a computer-implemented method for behavior-based IoT device security is provided. The method detects an action from a set of IoT devices. A context is identified for the action and at least one IoT device of the set of IoT devices. The action and the context are validated for the at least one IoT device. The action is identified as an anomaly based on the validating of the action and the context. A potential state change is identified for the at least one IoT device based on the anomaly. The method determines a responsive action based on the potential state change and the anomaly.

According to an embodiment described herein, a system for behavior-based IoT device security is provided. The system includes one or more processors and a computer-readable storage medium, coupled to the one or more processors, storing program instructions that, when executed by the one or more processors, cause the one or more processors to perform operations. The operations detect an action from a set of IoT devices. A context is identified for the action and at least one IoT device of the set of IoT devices. The action and the context are validated for the at least one IoT device. The action is identified as an anomaly based on the validating of the action and the context. A potential state change is identified for the at least one IoT device based on the anomaly. The operations determine a responsive action based on the potential state change and the anomaly.

According to an embodiment described herein, a computer program product for behavior-based IoT device security is provided. The computer program product includes a computer-readable storage medium having program instructions embodied therewith, the program instructions being executable by one or more processors to cause the one or more processors to detect an action from a set of IoT devices. A context is identified for the action and at least one IoT device of the set of IoT devices. The action and the context are validated for the at least one IoT device. The action is identified as an anomaly based on the validating of the action and the context. A potential state change is identified for the at least one IoT device based on the anomaly. The computer program product determines a responsive action based on the potential state change and the anomaly.

DETAILED DESCRIPTION

The present disclosure relates generally to methods for IoT device security. More particularly, but not exclusively, embodiments of the present disclosure relate to a computer-implemented method for behavior-based IoT device security. The present disclosure relates further to a related system for IoT device security, and a computer program product for operating such a system.

Internet of Things (IoT) devices have proliferated throughout the consumer and business space. IoT devices within the home are often described as smart home devices. Smart home devices include heating components, lighting components, door locks, blinds, and other common home accoutrements. Consumers may use IoT devices for heating and lighting in daily applications. Home rental users often use smart locks to enable remote unlocking of doors for guests. IoT devices in businesses and large enterprises can be similar in type and function to those within the consumer space. Enterprises often use IoT devices for heating, blinds, and site access.

Security of IoT devices is often based on access control and communications network security. IoT systems often fall prey to human errors and have little protection against stolen credentials. Security vulnerabilities in IoT systems can result in undesirable behavior of IoT devices, such as cold houses or increased utility bills. These security vulnerabilities may also result in more serious IoT device behaviors, such as unsecured doors.

Embodiments of the present disclosure enable machine learned behavior of IoT devices and sets of IoT devices to increase IoT device security. Embodiments of the present disclosure leverage behavior modeling to identify unexpected or anomalous behavior of IoT devices or sets of IoT devices. Embodiments of the present disclosure learn action or alert handling based on historical behavior of IoT devices, users, and administrators. Some embodiments of the present disclosure allow a system to prevent or override actions of IoT devices to correct detected anomalies. Some embodiments of the present disclosure enable automated decision making for notification generation and notification transmission of anomalies detected within IoT devices. Some embodiments of the present disclosure enable user feedback and tailoring of machine learned behaviors for IoT device alert handling.

Some embodiments of the concepts described herein may take the form of a system or a computer program product. For example, a computer program product may store program instructions that, when executed by one or more processors of a computing system, cause the computing system to perform operations described above with respect to the computer-implemented method. By way of further example, the system may comprise components, such as processors and computer-readable storage media. The computer-readable storage media may interact with other components of the system to cause the system to execute program instructions comprising operations of the computer-implemented method, described herein. For the purpose of this description, a computer-usable or computer-readable medium may be any apparatus that may contain means for storing, communicating, propagating, or transporting the program for use, by, or in connection with, the instruction execution system, apparatus, or device.

Figure 1:
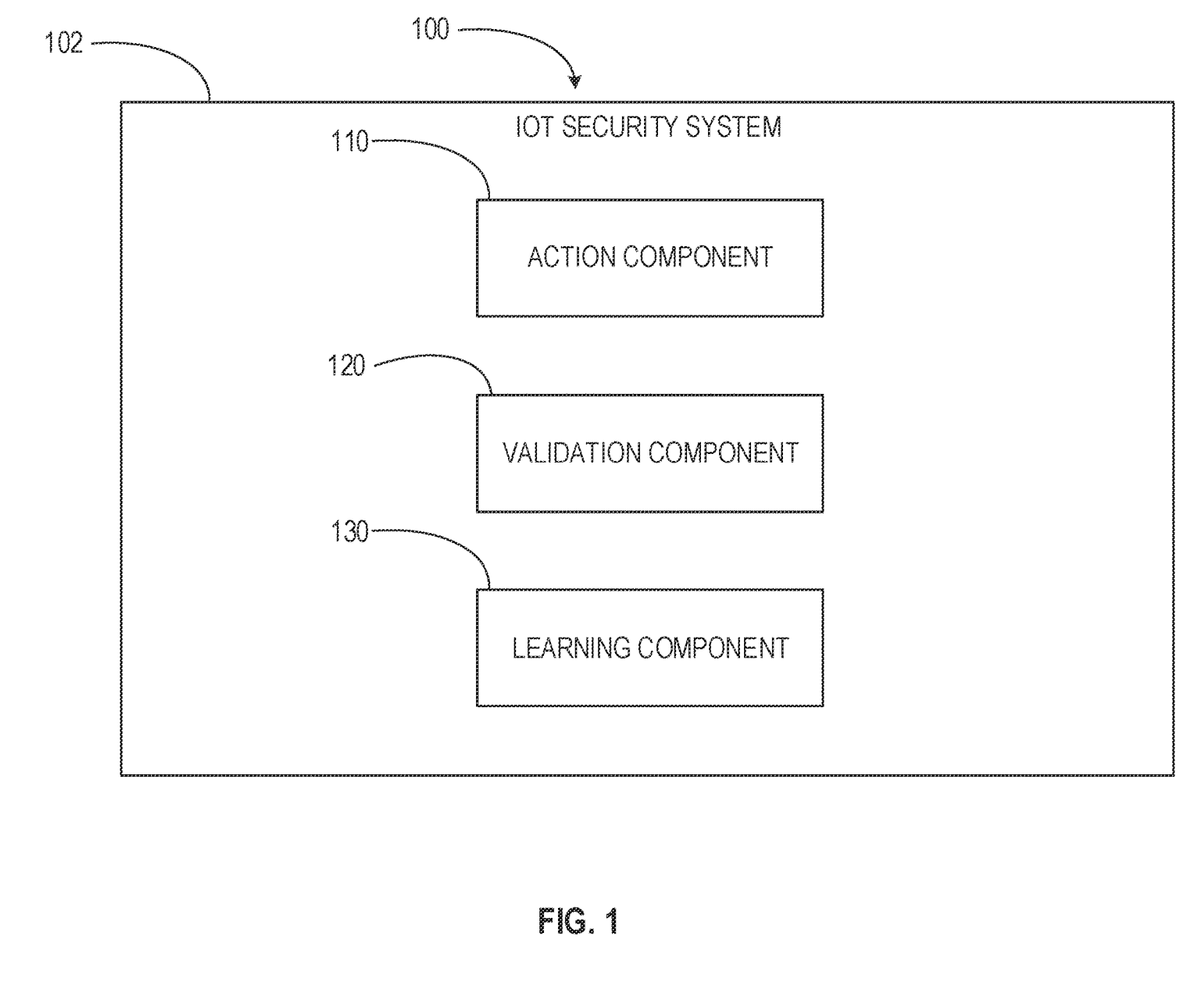
FIG. 1 depicts a block diagram of a computing environment for implementing concepts and computer-based methods, according to at least one embodiment.

Referring now to FIG. 1, a block diagram of an example computing environment 100 is shown. The present disclosure may be implemented within the example computing environment 100. In some embodiments, the computing environment 100 may be included within or embodied by a computer system, described below. The computing environment 100 may include an IoT security system 102. The IoT security system 102 may comprise an action component 110, a validation component 120, and a learning component 130. The action component 110 receives input relating to IoT devices, user actions on IoT devices, and determines responsive actions for the IoT devices. The validation component 120 validates action and context inputs for the action component 110. The learning component 130 develops behavioral models for user, administrator, and IoT device combinations. Although described with distinct components, it should be understood that, in at least some embodiments, components may be combined or divided, and/or additional components may be added without departing from the scope of the present disclosure.

Figure 2:
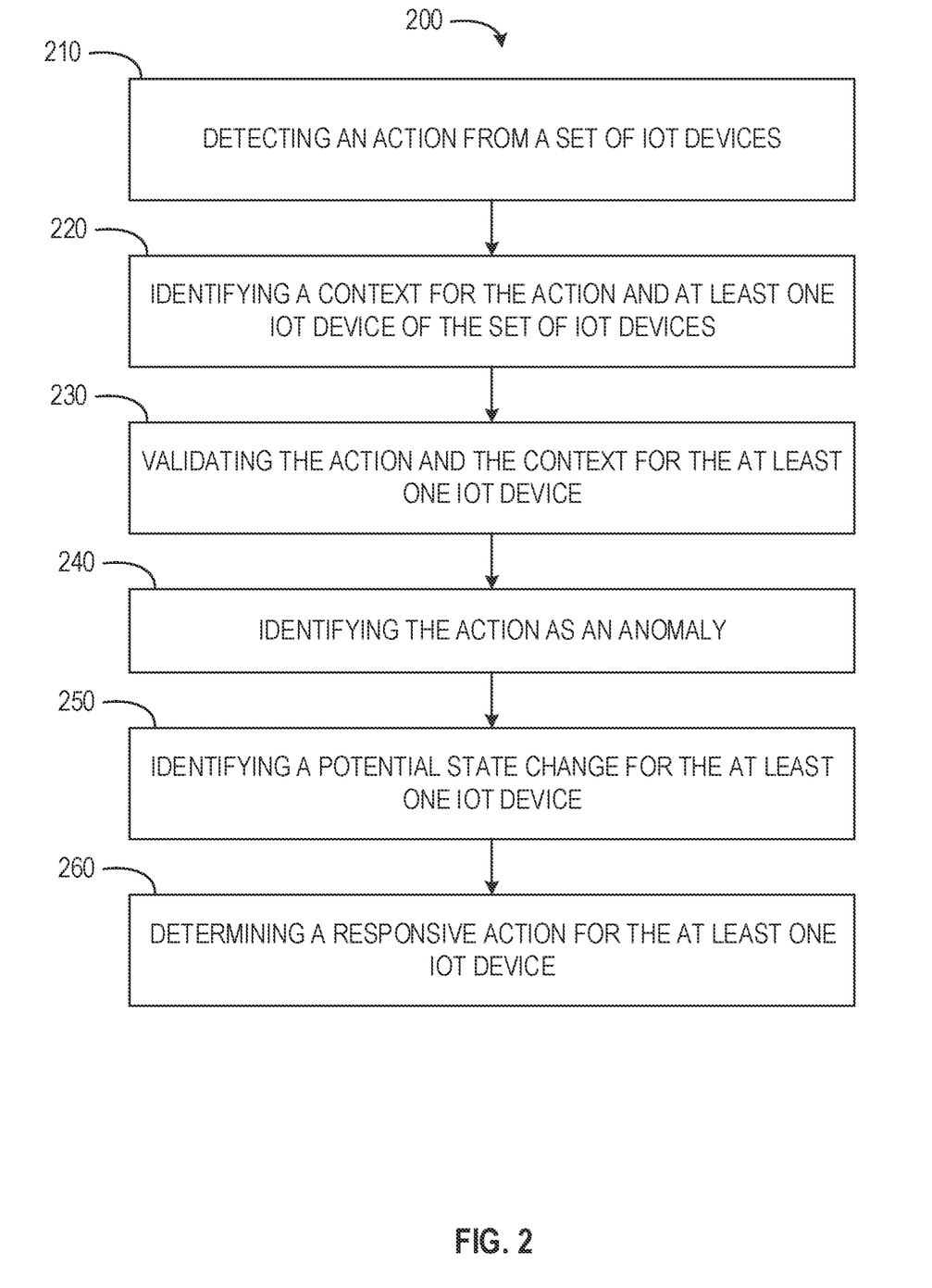
FIG. 2 depicts a flow diagram of a computer-implemented method for behavior-based Internet of Things (IoT) device security, according to at least one embodiment.

Referring now to FIG. 2, a flow diagram of a computer-implemented method 200 is shown. The computer-implemented method 200 is a method for behavior-based IoT device security. In some embodiments, the computer-implemented method 200 may be performed by one or more components of the computing environment 100, as described in more detail below.

At operation 210, the action component 110 detects an action from a set of IoT devices. The action may be detected by the action component 110 receiving an action request from a cloud service or within a communications network. The action may be detected as a current operation being performed by at least one IoT device of the set of IoT devices. The action may also be detected as a user selection for an action of at least one IoT device of the set of IoT devices. In such instances, the action may be detected as a user selection on a user interface, a control panel, manipulation of a button or switch on an IoT device, or any other suitable interaction by a user with an IoT device. In some embodiments, the action may be detected as a user request for an IoT operation.

In some embodiments, the action is generated by and detected through an IoT Gateway or a cloud-based IoT service. The IoT gateway may generate or act as a wrapper for direct interactions from users of the set of IoT devices. The IoT gateway may operate without involving external or cloud services. In some instances, the IoT gateway uses a ZigBee standard. The IoT gateway may also use physical buttons or input devices. The IoT gateway may form and enable detection of the action through direct control of a user. The cloud-based IoT services may generate or act as a wrapper for the action from or channeled through a cloud service. The cloud service may be an automated solution, an IoT device, or any other suitable implementation operating through a communications network. The cloud-based IoT services may use adapters to monitor and channel input of multiple cloud and internet services to the action component 110.

At operation 220, the action component 110 identifies a context for the action. In some embodiments, the action component 110 also identifies a context for at least one IoT device of the set of IoT devices. The context identified for the action may include a time of the action. The time may indicate a time of the action or action request, a time of day, a day of the week or month, a recurring time of the action, a starting time of the action or request, a scheduled time of the action, or any other suitable time. The context identified for the action may include a location of the IoT device or set of IoT devices associated with the action. The location may include a geographical location, a location within a domicile or building, or a location relative to other IoT devices. The context identified for the action may include sensor information. For example, the context may indicate sensor information from the IoT device associated with the action or from other IoT devices of the set of IoT devices that are not associated with the action. The context identified for the action may also include a security configuration. The security configuration may be a set of security rules, permissions, or other definitions indicating acceptable actions or characteristics of acceptable actions.

At operation 230, the validation component 120 validates the action and the context for the at least one IoT device. The validation component 120 may validate the action and the context based on a current user profile associated with the IoT device and the context, IoT usage history of the IoT device, and any available contextual information. In some embodiments, the validation component 120 validates the action and the context as being a valid action request for the at least one IoT device. For example, the validation component 120 may determine an action is invalid where the at least one IoT device is not capable of performing the requested action. The validation component 120 may validate the action and the context as being a valid action with an invalid context. For example, the validation component 120 may determine the action is a valid requested action for the at least one IoT device but may not be performed within a given context, such as a time context or sensor context. In some embodiments, the validation component 120 determines the action and the context are valid for the at least one IoT device. While the action and context may be valid (e.g., capable of being performed), the action and context may still be considered anomalous.

In some embodiments, the validation component 120 validates the action and the context by accessing a usage history of the at least one IoT device. The validation component 120 determines a current user profile. The current user profile may be associated with the at least one IoT device. The validation component 120 compares the action and the context to the usage history and the current user profile for the at least one IoT device.

At operation 240, the action component 110 identifies the action as an anomaly. In some embodiments, the anomaly is identified based on the validating of the action and the context. The action component 110 may identify the action as an anomaly where the action is invalid, the context is invalid, or one or more of the action and the context represent a security issue. Where the action or context represent a security issue, the action or the context may be determined to be out of the ordinary or abnormal or that one or more of the action and the context are abnormal for a user associated with the action. The action component 110 may identify the action as an anomaly by passing the action or an indicator of the action to a behavior model associated with at least one IoT device of the set of IoT devices. The behavior model may return an indication of the action as being an anomaly based on a machine learning model trained on usage history and user actions associated with the IoT device. In some instances, the action component 110 passes the action and the context to the behavior model. The behavior model may return an indication of the action as being an anomaly based on a machine learning model trained on usage history, user actions, and context considerations associated with the IoT device.

At operation 250, the action component 110 identifies a potential state change for the at least one IoT device. In some embodiments, the potential state change is identified based on the anomaly. The action component 110 identifies the potential state change by identifying a current state of the IoT device. The current state of the IoT device may be a powered state (e.g., off or on), a power consumption state (e.g., how much power is currently being drawn), an operational state, or any other suitable state of the IoT device. The action component 110 identifies a suggested state for the IoT device. The suggested state may be a state that is distinct from the current state. The suggested state may be identified based on a usage history and a current user profile for the at least one IoT device and the anomaly. For example, the suggested state may be identified based on the action or action request, the current state of the IoT device, and a behavior model for the IoT device.

At operation 260, the action component 110 determines a responsive action for the at least one IoT device. In some embodiments, the responsive action is determined based on the potential state change and the anomaly. In some instances, the responsive action is determined based on the potential state change, the anomaly, a usage history for the at least one IoT device, user behavior associated with the at least one IoT device, and administrator responses to previous notifications about the at least one IoT device.

In some embodiments, the action component 110 modifies a state of the at least one IoT device in response to determining the responsive action. The action component 110 may modify the state of the at least one IoT device from the current state to the suggested state.

In some embodiments, the action component 110 determines the responsive action by determining an administrator of the at least one IoT device. The action component 110 generates a notification for the administrator. The action component 110 may generate the notification where the action detected in operation 210 represents a security issue. In some embodiments, the notification represents the anomaly and the potential state change of the at least one IoT device. The action component 110 then transmits the notification to the administrator. The notification may be transmitted to the administrator using any suitable channel or mechanism, such as email, notification push, browser notification, text, or any other suitable transmission mechanism.

The notification may operate as an alert sent to the administrator, the user associated with the action or the IoT, an organization, or any other suitable entity. The notification may provide the administrator a method, tool, or functionality to validate the action, reverse the action, prevent the action from taking place, or any other suitable administrator response. Once the notification has been generated, transmitted, and a response to the notification has been received, data representing these processes may be included as feedback and user action in response to an alert. The feedback and user action may be provided to the learning component 130 for incorporation into a behavior model for the affected IoT device or the set of IoT devices.

In some embodiments, the action component 110 performs a function or action as part of or in response to determining the responsive action. In some instances, the action component 110 determines a usage history of the at least one IoT device. The action component 110 determines a notification response history for the at least one IoT device. The usage history and the notification response history may be contained or represented within a behavior model for the IoT device associated with the action identified in operation 210. The action component 110 may determine the usage history and the notification response history by passing the action detected in operation 210 through the behavior model for the IoT device. The action component 110 may receive an action or set of actions from the behavior model as a potential responsive action. The action component 110 may select a responsive action from a set of actions received from the behavior model and perform the responsive action on the IoT device. For example, where an apartment has smartplugs from which a hair curler and a slow cooker are drawing power, the action component may detect the action of drawing power by the slow cooker and the hair curler. The action component 110 may validate the power draw actions and determine that both actions are anomalies. The action component 110 may determine that a past appropriate action for the hair curler is to cease power supplied to the hair curler based on usage history and notification responses. The action component 110 may determine the slow cooker is allowed to draw power based on previous usage history and previous notifications being marked as a false positive. The action component 110 may then perform no function or action in response to the slow cooker drawing power.

The notification feedback may be collected from the administrator asynchronously from the rest of the operations of the method 200. The action component 110 may collect feedback to the notification and pass the feedback to the learning component 130. The learning component 130 may use the feedback to determine whether an action was approved, a label applied to the action (e.g., false positive, normal, acceptable), and identify any applied exclusions for the action.

Where the action component 110 performs no action based on the responsive action, the action component 110 determines a usage history of the at least one IoT device. The action component determines a notification response history for the at least one IoT device. The action component then determines the responsive action as generating an allowed tag for the anomaly and performing no further actions on the IoT device. For example, the action component 110 may perform no further action if the anomaly is not suspicious or if the anomaly is of a type which has previously and repeatedly been dismissed. In such instances, the action component generates the allowed tag based on the usage history and the notification response history.

Figure 3:
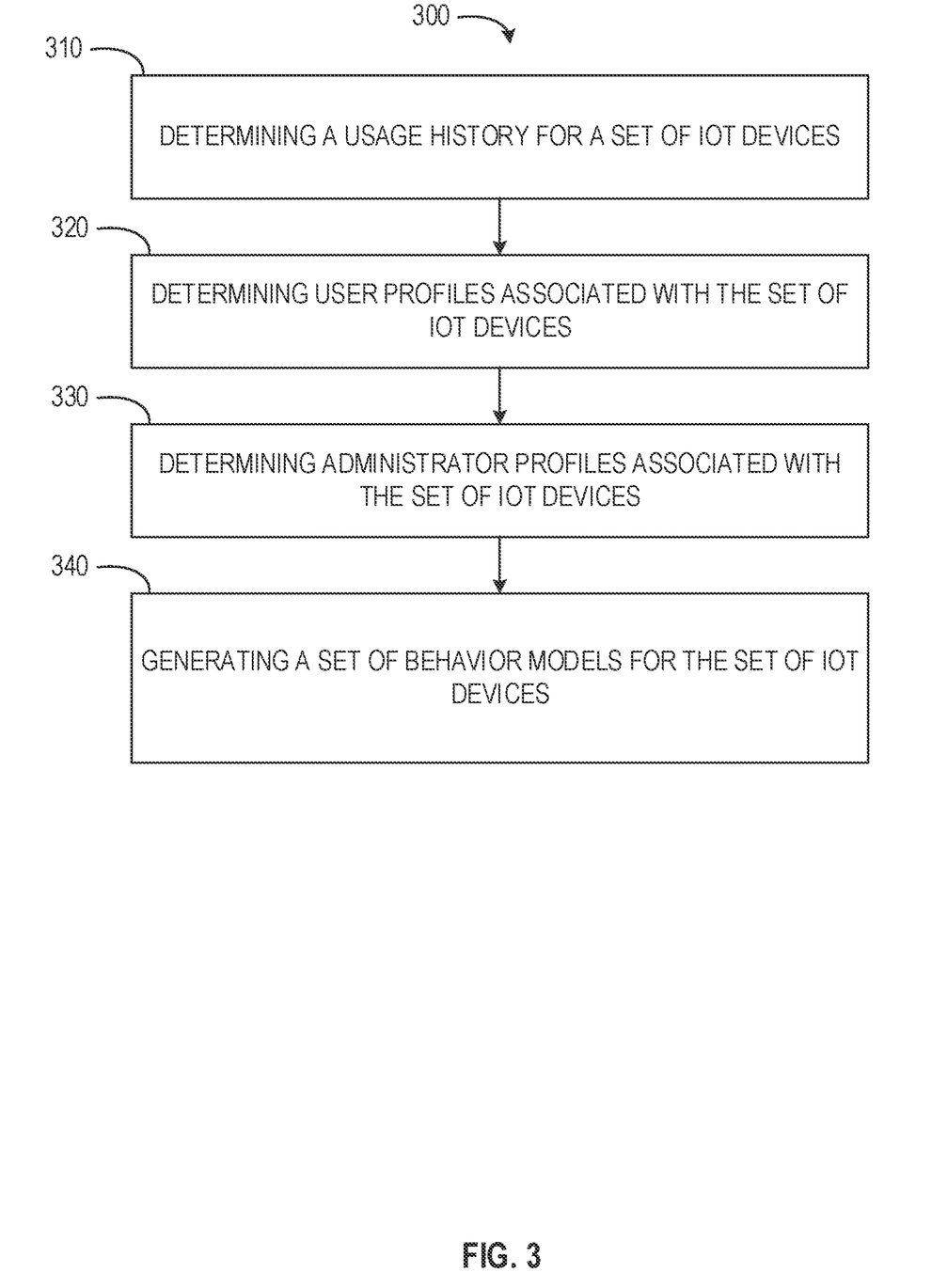
FIG. 3 depicts a flow diagram of a computer-implemented method for behavior-based IoT device security, according to at least one embodiment.

FIG. 3 shows a flow diagram of an embodiment of a computer-implemented method 300 for behavior-based IoT device security. The method 300 may be performed by or within the computing environment 100. In some embodiments, the method 300 comprises or incorporates one or more operations of the method 200. In some instances, operations of the method 300 may be incorporated as part of or sub-operations of the method 200.

In operation 310, the learning component 130 determines a usage history for a set of IoT devices. The learning component 130 may determine usage history of the set of IoT devices through available training data, IoT devices to which the IoT security system 102 has been given access, historical data or logs associated with IoT devices providing access to the IoT security system 102, combinations thereof, and any other suitable data. Available training data may include data of operations and actions of IoT devices from the set of IoT devices at a current location, IoT devices at another location, IoT devices outside the set of IoT devices, or any other suitable training data. In some embodiments, the usage history is included in cloud-based data associated with the set of IoT devices. The learning component 130 may access the cloud-based data and identify or determine the usage history based on IoT device accounts, IoT device identifiers, or any other suitable identification.

In some embodiments, the learning component 130 accesses and processes historical and current data and logs associated with the set of IoT devices at an initiation of the IoT security system 102. The learning component 130 may periodically access current data and logs in the cloud-based data to update behavior models generated for IoT devices of the set of IoT devices.

In operation 320, the learning component 130 determines user profiles associated with the set of IoT devices. In some embodiments, user profiles represent user actions associated with or performed on IoT devices of the set of IoT devices. The user profiles may contain no user identifying information. In some instances, user profiles contain information relating to a user, where the user has opted into the creation of such a profile. In such instances, the user profile may contain information provided by the user and actions the user has taken relative to the IoT devices (e.g., locking a door or turning on heat).

The learning component 130 may determine the user profiles by accessing the cloud-based data associated with the IoT devices and the usage history of the set of IoT devices. Once accessed, the learning component 130 may identify commands associated with the usage history of the IoT devices. The commands initiating at least a portion of the usage history may comprise or comprise a portion of the user profiles associated with the set of IoT devices. In some instances, data relating to each IoT device may be linked within the cloud-based data. In such instances, when the learning component 130 accesses the user profiles, learning component 130 may use linked database records to determine user profiles associated with each IoT device of the set of IoT devices.

In operation 330, the learning component 130 determines administrator profiles associated with the set of IoT devices. In some embodiments, the learning component 130 determines the administrator profiles in a manner similar to or the same as used to determine the user profiles. The administrator associated with an IoT device or the set of IoT devices may be the same as a user, one of a plurality of users, or may be distinct from a user. Where the administrator is distinct from or one of a plurality of users of the IoT devices, the plurality of users may be arranged based on a relationship. For example, the plurality of users may be arranged within a hierarchical relationship, with the administrator being at a top of the hierarchy.

In some embodiments, the learning component 130 incorporates historical actions of the administrator into a set of training data after determining the administrator profiles associated with the set of IoT devices. In such embodiments, once an administrator has been identified for an IoT device or a set of IoT devices, the learning component 130 identifies and collects historical alerts or notifications transmitted to the administrator regarding the IoT device(s). The historical alerts or notifications may indicate time and date information, a cause of the alert (e.g., action or operation performed by an IoT device), a communication type used to transmit the alert or notification, and any other suitable data. The learning component 130 may collect historical feedback or responses of the admin to the historical alerts or notifications. In such instances, the learning component 130 collects data indicating or representing actions executed by the admin, actions flagged as suspicious, and any other suitable actions or lack of actions performed by the administrator in responding to the historical alerts or notifications. The learning component 130 may then incorporate the historical alerts or notifications, the responsive actions, and any other suitable data into the administrator profiles. In some instances, the administrator profiles already include the historical alerts or notifications and responsive actions upon being determined or identified by the learning component 130.

In operation 340, the learning component 130 generates a set of behavior models for the set of IoT devices. The learning component 130 may generate a behavior model for each IoT device of the set of IoT devices. In some embodiments, the learning component 130 performs artificial intelligence (AI) or machine learning operations on training data available to the learning component 130. The training data may include designated training data generated for machine learning purposes. In some embodiments, the training data comprises the usage history of the set of IoT devices, the user profiles associated with the set of IoT devices, and the administrator profiles associated with the set of IoT devices. The learning component 130 may generate the set of behavior models using data gained or collected from use of and user interactions with the set of IoT devices.

In some embodiments, the learning component 130 generates initial models for at least a portion of IoT devices of the set of IoT devices. The learning component may generate the initial models from available or shared training data associated with the set of IoT devices. The training data may represent operations or potential operations of at least a portion of the set of IoT devices.

The learning component 130 generates the set of behavior models based on user specific patterns for each IoT device. In some embodiments, the behavior models incorporate any initial models generated for the set of IoT devices. The learning component 130 may take input actions directed to any IoT device of the set of IoT devices and incorporate the input actions and users associated with the input actions to generate the set of behavior models. The set of behavior models may represent user actions and patterns indicated from the usage history and user profiles of the set of IoT devices. In some instances, the set of behavior models learn user patterns on IoT device usage and provide output insights on security concerns arising from the actions. Behavior models may be stored privately in user data storage or user profiles from which the behavior model is generated.

The learning component 130 may also use feedback, responses, or actions of administrators in generating the set of behavior models. In such instances, the learning component 130 identifies administrator actions, responses, or feedback to notifications, IoT actions, or user actions and trains the set of behavior models to incorporate those administrator actions. The resulting set of behavior models may represent expected outputs and actions of users and administrators for specified IoT devices, as well as general operations or settings of those IoT devices which may prompt user or administrator intervention or response.

Figure 4:
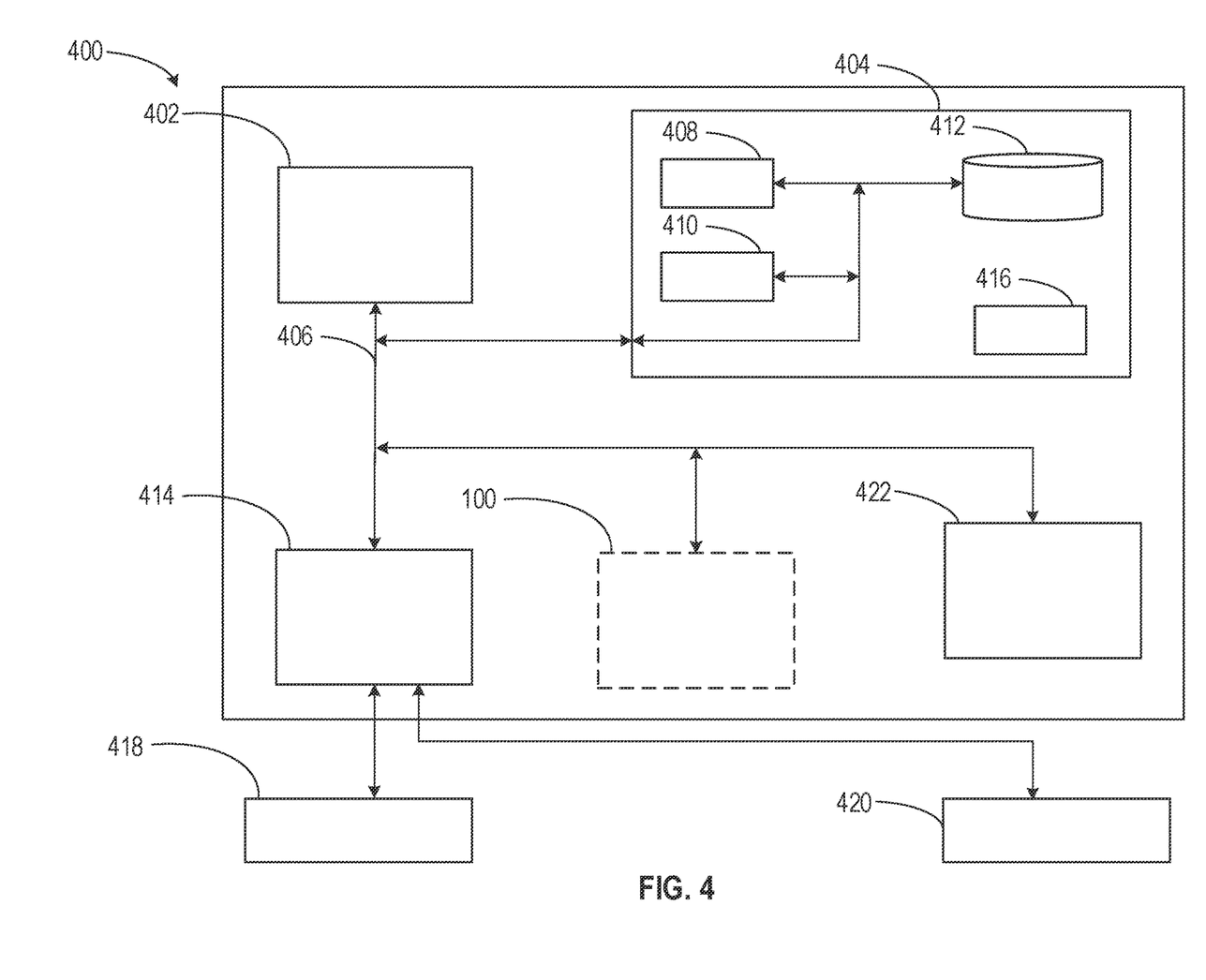
FIG. 4 depicts a block diagram of a computing system for behavior-based IoT device security, according to at least one embodiment.

Embodiments of the present disclosure may be implemented together with virtually any type of computer, regardless of the platform is suitable for storing and/or executing program code. FIG. 4 shows, as an example, a computing system 400 (e.g., cloud computing system) suitable for executing program code related to the methods disclosed herein and for behavior-based IoT device security.

The computing system 400 is only one example of a suitable computer system and is not intended to suggest any limitation as to the scope of use or functionality of embodiments of the present disclosure described herein, regardless, whether the computer system 400 is capable of being implemented and/or performing any of the functionality set forth hereinabove. In the computer system 400, there are components, which are operational with numerous other general purpose or special purpose computing system environments or configurations. Examples of well-known computing systems, environments, and/or configurations that may be suitable for use with computer system/server 400 include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like. Computer system/server 400 may be described in the general context of computer system-executable instructions, such as program modules, being executed by a computer system 400. Generally, program modules may include routines, programs, objects, components, logic, data structures, and so on that perform particular tasks or implement particular abstract data types. Computer system/server 400 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 400 is shown in the form of a general-purpose computing device. The components of computer system/server 400 may include, but are not limited to, one or more processors 402 (e.g., processing units), a system memory 404 (e.g., a computer-readable storage medium coupled to the one or more processors), and a bus 406 that couple various system components including system memory 404 to the processor 402. Bus 406 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 400 typically includes a variety of computer system readable media. Such media may be any available media that is accessible by computer system/server 400, and it includes both, volatile and non-volatile media, removable and non-removable media.

The system memory 404 may include computer system readable media in the form of volatile memory, such as random-access memory (RAM) 408 and/or cache memory 410. Computer system/server 400 may further include other removable/non-removable, volatile/non-volatile computer system storage media. By way of example only, a storage system 412 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 406 by one or more data media interfaces. As will be further depicted and described below, the system memory 404 may include at least one program product having a set (e.g., at least one) of program modules that are configured to carry out the functions of embodiments of the present disclosure.

The program/utility, having a set (at least one) of program modules 416, may be stored in the system memory 404 by way of example, and not limiting, as well as an operating system, one or more application programs, other program modules, and program data. Program modules may include one or more of the action component 110, the validation component 120, and the learning component 130, which are illustrated in FIG. 1. Each of the operating systems, one or more application programs, other program modules, and program data or some combination thereof, may include an implementation of a networking environment. Program modules 416 generally carry out the functions and/or methodologies of embodiments of the present disclosure, as described herein.

The computer system/server 400 may also communicate with one or more external devices 418 such as a keyboard, a pointing device, a display 420, etc.; one or more devices that enable a user to interact with computer system/server 400; and/or any devices (e.g., network card, modem, etc.) that enable computer system/server 400 to communicate with one or more other computing devices. Such communication can occur via Input/Output (I/O) interfaces 414. Still yet, computer system/server 400 may communicate with one or more networks such as a local area network (LAN), a general wide area network (WAN), and/or a public network (e.g., the Internet) via network adapter 422. As depicted, network adapter 422 may communicate with the other components of computer system/server 400 via bus 406. It should be understood that, although not shown, other hardware and/or software components could be used in conjunction with computer system/server 400. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Service models may include software as a service (SaaS), platform as a service (PaaS), and infrastructure as a service (IaaS). In SaaS, the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings. In PaaS, the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. In IaaS, the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment models may include private cloud, community cloud, public cloud, and hybrid cloud. In private cloud, the cloud infrastructure is operated solely for an organization. It may be managed by the organization or a third party and may exist on-premises or off-premises. In community cloud, the cloud infrastructure is shared by several organizations and supports specific community that has shared concerns (e.g., mission, security requirements, policy, and compliance considerations). It may be managed by the organizations or a third party that may exist on-premises or off-premises. In public cloud, the cloud infrastructure is made available to the general public or a large industry group and is owned by an organization selling cloud services. In hybrid cloud, the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling modularity, and semantic interoperability. At the heart of cloud computing is an infrastructure that includes a network of interconnected nodes.

Figure 5:
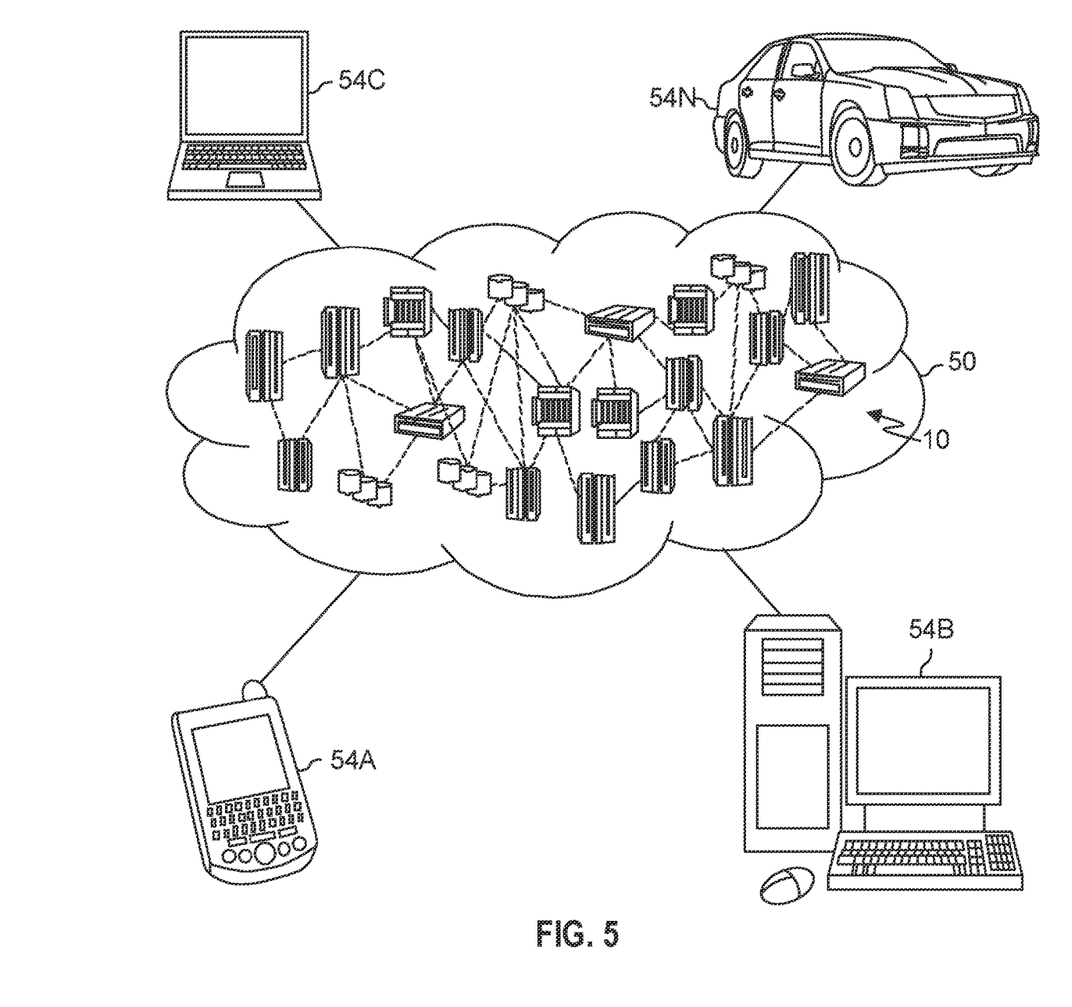
FIG. 5 is a schematic diagram of a cloud computing environment in which concepts of the present disclosure may be implemented, in accordance with an embodiment of the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
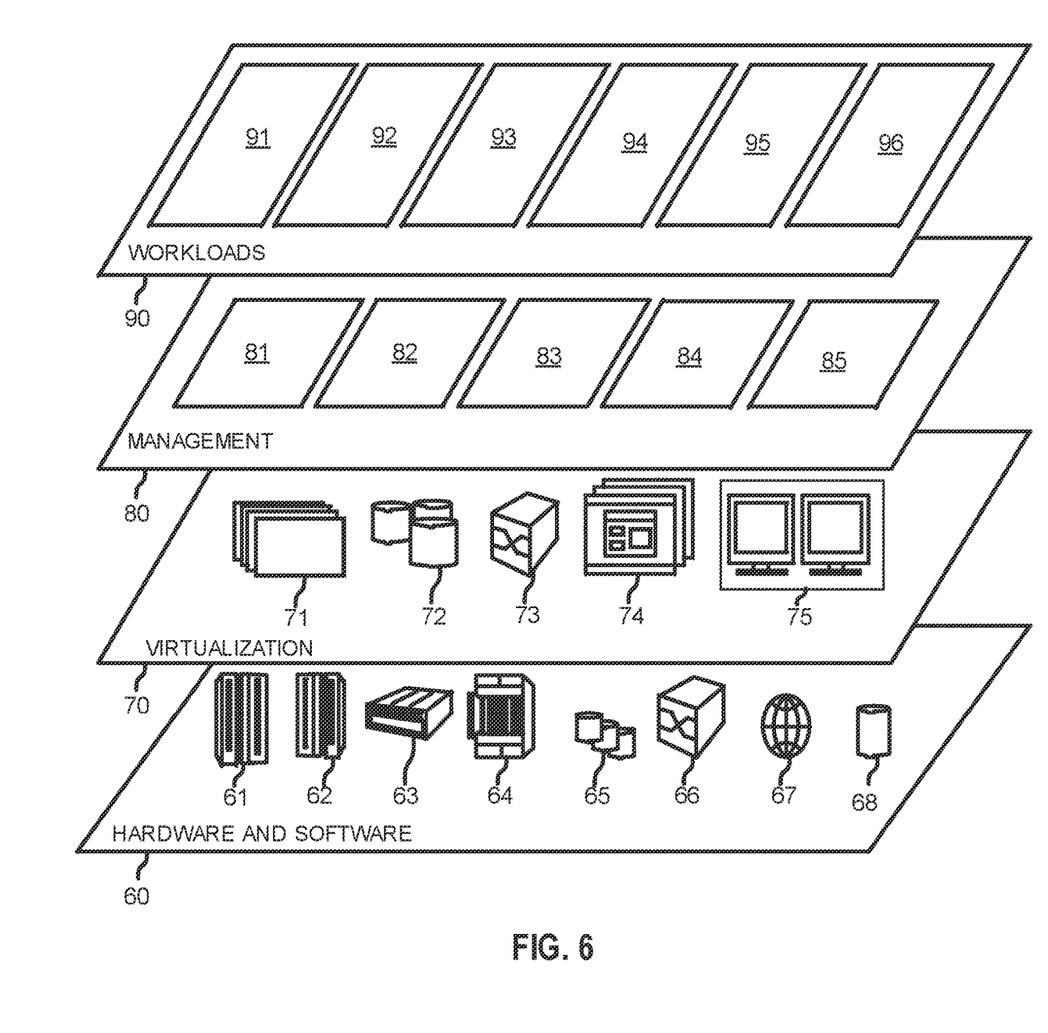
FIG. 6 is a diagram of model layers of a cloud computing environment in which concepts of the present disclosure may be implemented, in accordance with an embodiment of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and IoT security processing 96.

Cloud models may include characteristics including on-demand self-service, broad network access, resource pooling, rapid elasticity, and measured service. In on-demand self-service a cloud consumer may unilaterally provision computing capabilities such as server time and network storage, as needed automatically without requiring human interaction with the service's provider. In broad network access, capabilities are available over a network and accessed through standard mechanisms that promote use by heterogeneous thin or thick client platforms (e.g., mobile phones, laptops, and PDAs). In resource pooling, the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). In rapid elasticity, capabilities can be rapidly and elastically provisioned, in some cases automatically, to quickly scale out and rapidly released to quickly scale in. To the consumer, the capabilities available for provisioning often appear to be unlimited and can be purchased in any quantity at any time. In measured service, cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

The descriptions of the various embodiments of the present disclosure have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer-readable storage medium (or media) having computer readable program instructions thereon for causing a processor to carry out aspects of the present invention.

The computer-readable storage medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer-readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present disclosure has been presented for purposes of illustration and description, but is not intended to be exhaustive or limited to the present disclosure in the form disclosed. Many modifications and variations will be apparent to those of ordinary skills in the art without departing from the scope of the present disclosure. The embodiments are chosen and described in order to explain the principles of the present disclosure and the practical application, and to enable others of ordinary skills in the art to understand the present disclosure for various embodiments with various modifications, as are suited to the particular use contemplated.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    detecting an action from a set of Internet of Things (IoT) devices;
    identifying a context for the action and at least one IoT device of the set of IoT devices;
    validating the action and the context for the at least one IoT device;
    based on the validating the action and the context, identifying the action as an anomaly;
    identifying a potential state change for the at least one IoT device based on the anomaly;
    determining whether an allowed tag for the anomaly exists, wherein the allowed tag is based on a usage history of the at least one IoT device and a notification response history for the at least one IoT device; and
    determining a responsive action based on the potential state change, existence of the allowed tag, and the anomaly.

2. The method of claim 1, wherein validating the action and the context further comprises:
    determining the usage history of the at least one IoT device;
    determining a current user profile associated with the at least one IoT device; and
    comparing the action and the context to the usage history and the current user profile for the at least one IoT device.

3. The method of claim 2, wherein identifying the potential state change for the at least one IoT device further comprises:
    identifying a current state of the IoT device; and
    identifying a suggested state for the IoT device based on the usage history, the current user profile, and the anomaly.

4. The method of claim 3, wherein determining the responsive action further comprises:
    modifying a state of the at least one IoT device from the current state to the suggested state.

5. The method of claim 1, wherein determining the responsive action further comprises:
    determining an administrator of the at least one IoT device;
    generating a notification representing the anomaly and the potential state change of the at least one IoT device; and
    transmitting the notification to the administrator.

6. The method of claim 1, further comprising:
    determining the usage history of the at least one IoT device;
    determining the notification response history for the at least one IoT device; and
    performing the responsive action on the IoT device.

7. The method of claim 1, wherein determining the responsive action further comprises:
    determining the usage history of the at least one IoT device;
    determining the notification response history for the at least one IoT device; and
    based on the usage history and the notification response history, determining the responsive action as generating the allowed tag for the anomaly.

8. A system, comprising:
one or more processors; and
a computer-readable storage medium, coupled to the one or more processors, storing program instructions that, when executed by the one or more processors, cause the one or more processors to perform operations comprising:
  detecting an action from a set of Internet of Things (IoT) devices;
  identifying a context for the action and at least one IoT device of the set of IoT devices;
  validating the action and the context for the at least one IoT device;
  based on the validating the action and the context, identifying the action as an anomaly;
  identifying a potential state change for the at least one IoT device based on the anomaly;
  determining whether an allowed tag for the anomaly exists, wherein the allowed tag is based on a usage history of the at least one IoT device and a notification response history for the at least one IoT device; and
  determining a responsive action based on the potential state change, existence of the allowed tag, and the anomaly.

9. The system of claim 8, wherein validating the action and the context further comprises:
  determining the usage history of the at least one IoT device;
  determining a current user profile associated with the at least one IoT device; and
  comparing the action and the context to the usage history and the current user profile for the at least one IoT device.

10. The system of claim 9, wherein identifying the potential state change for the at least one IoT device further comprises:
  identifying a current state of the IoT device; and
  identifying a suggested state for the IoT device based on the usage history, the current user profile, and the anomaly.

11. The system of claim 10, wherein determining the responsive action further comprises:
  modifying a state of the at least one IoT device from the current state to the suggested state.

12. The system of claim 8, wherein determining the responsive action further comprises:
  determining an administrator of the at least one IoT device;
  generating a notification representing the anomaly and the potential state change of the at least one IoT device; and
  transmitting the notification to the administrator.

13. The system of claim 8, wherein the operations further comprise:
  determining the usage history of the at least one IoT device;
  determining the notification response history for the at least one IoT device; and
  performing the responsive action on the IoT device.

14. The system of claim 8, wherein determining the responsive action further comprises:
  determining the usage history of the at least one IoT device;
  determining the notification response history for the at least one IoT device; and
  based on the usage history and the notification response history, determining the responsive action as generating the allowed tag for the anomaly.

15. A computer program product comprising a computer-readable storage medium having program instructions embodied therewith, the program instructions being executable by one or more processors to cause the one or more processors to perform operations comprising:
  detecting an action from a set of Internet of Things (IoT) devices;
  identifying a context for the action and at least one IoT device of the set of IoT devices;
  validating the action and the context for the at least one IoT device;
  based on the validating the action and the context, identifying the action as an anomaly;
  identifying a potential state change for the at least one IoT device based on the anomaly;
  determining whether an allowed tag for the anomaly exists, wherein the allowed tag is based on a usage history of the at least one IT device and a notification response history for the at least one IoT device; and
  determining a responsive action based on the potential state change, existence of the allowed tag, and the anomaly.

16. The computer program product of claim 15, wherein validating the action and the context further comprises:
  determining the usage history of the at least one IoT device;
  determining a current user profile associated with the at least one IoT device; and
  comparing the action and the context to the usage history and the current user profile for the at least one IoT device.

17. The computer program product of claim 16, wherein identifying the potential state change for the at least one IoT device further comprises:
  identifying a current state of the IoT device; and
  identifying a suggested state for the IoT device based on the usage history, the current user profile, and the anomaly.

18. The computer program product of claim 15, wherein determining the responsive action further comprises:
  determining an administrator of the at least one IoT device;
  generating a notification representing the anomaly and the potential state change of the at least one IoT device; and
  transmitting the notification to the administrator.

19. The computer program product of claim 15, wherein the operations further comprise:
  determining the usage history of the at least one IoT device;
  determining the notification response history for the at least one IoT device; and
  performing the responsive action on the IoT device.

20. The computer program product of claim 15, wherein determining the responsive action further comprises:
  determining the usage history of the at least one IoT device;
  determining the notification response history for the at least one IoT device; and
  based on the usage history and the notification response history, determining the responsive action as generating the allowed tag for the anomaly.

* * * * *